United States Patent [19]

Loch

[11] 4,064,618
[45] Dec. 27, 1977

[54] METHOD OF POSITIONING AN EXPLOSIVE INSERT IN A VERTICAL TUBE

[75] Inventor: Emil P. Loch, Tampa, Fla.

[73] Assignee: Westinghouse Electric Corporation, Pittsburgh, Pa.

[21] Appl. No.: 771,609

[22] Filed: Feb. 24, 1977

Related U.S. Application Data

[62] Division of Ser. No. 634,000, Nov. 20, 1975, Pat. No. 4,030,419.

[51] Int. Cl.² .............................................. B23P 11/02
[52] U.S. Cl. ...................................... 29/451; 29/157.4; 29/453
[58] Field of Search ...................... 29/450, 453, 421 E, 29/451, 157.4; 102/24 R

[56] References Cited

U.S. PATENT DOCUMENTS

| 2,707,437 | 5/1955 | Noddin et al. | 102/24 R |
| 2,998,985 | 9/1961 | Burns et al. | 29/450 UX |
| 3,409,969 | 11/1968 | Simons et al. | 29/421 E X |
| 3,426,681 | 2/1969 | Oliver | 102/24 R |
| 3,461,536 | 8/1969 | Skold | 29/453 X |
| 3,543,370 | 12/1970 | Berman et al. | 29/157.4 |
| 3,691,617 | 9/1972 | Burnett | 29/451 X |
| 3,785,291 | 1/1974 | Bergbauer | 102/24 R |
| 3,993,001 | 11/1976 | Hawes | 102/24 R |

Primary Examiner—Charlie T. Moon
Attorney, Agent, or Firm—F. J. Baehr, Jr.

[57] ABSTRACT

A resilient insert for explosively expanding a tube in a tube sheet having a bore which receives an explosive cord, a counter bore, a sleeve which is fastened to the bored end of the insert to position the tube and a positioning wafer which positions the explosive cord within the insert.

5 Claims, 5 Drawing Figures

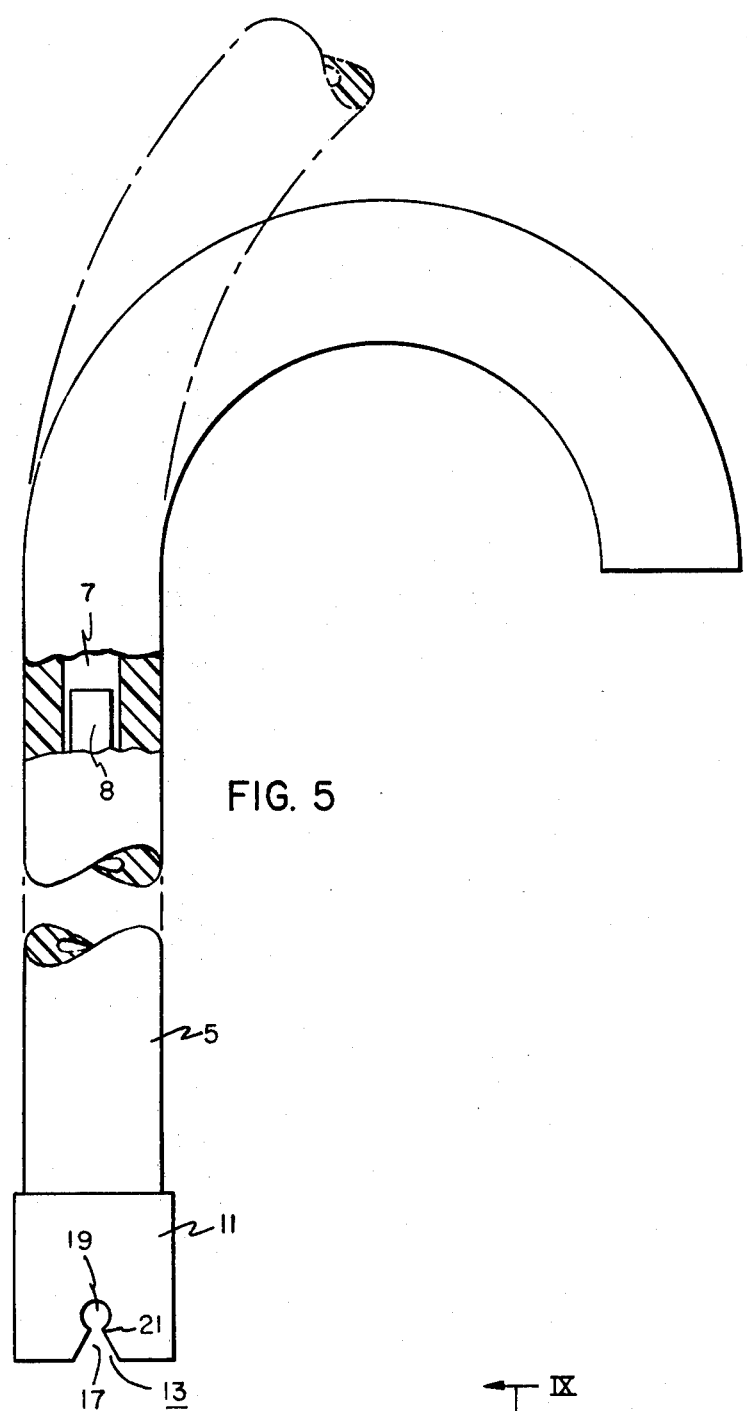
FIG. 5
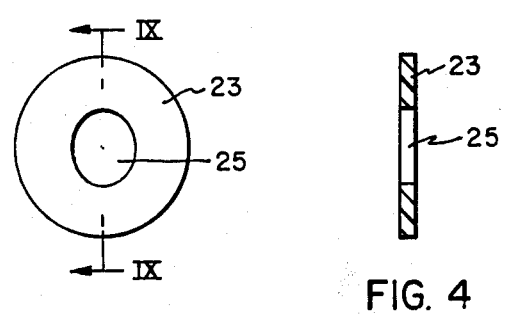
FIG. 3
FIG. 4

METHOD OF POSITIONING AN EXPLOSIVE INSERT IN A VERTICAL TUBE

This is a division of application Ser. No. 634,000 filed Nov. 20, 1975, now U.S. Pat. No. 4,030,419.

BACKGROUND OF THE INVENTION

This invention relates to an insert utilized to explosively expand a tube into engagement with the tube sheet and a method for holding the insert in a vertically oriented tube.

Mechanical expansion of tubes and tube sheets or rolling is well known in the art, a more recent development in explosive expansion of tubes into engagement with a tube sheet as described in U.S. Pat. Nos. 3,411,198 and 3,426,681. Explosive expanding is generally faster and more efficient than mechanically expanding and explosive expanding is accompanied by very little axial growth of the tube compared to mechanical expanding. Explosive expanding also requires less access to the tube sheet and reduces the amount of time personnel are in the proximity of the tube sheet. This latter advantage is particularly important when the heat exchanger is radioactive.

SUMMARY OF THE INVENTION

In general a resilient insert for explosively expanding tubes into engagement with a tube sheet utilizing an explosive cord, when made in accordance with this invention, comprises an outer diameter which is slightly smaller than the inner diameter of the tube, a length substantially longer than the tube sheet is thick, a bore extending from one end of the insert for receiving the explosive cord. The bore is substantially longer than the tube sheet is thick, but does not extend all the way through the insert. The insert also has a counterbore and comprises a sleeve attached to the bored end. The sleeve extends beyond the end of the insert and has diametrically opposed triangular slots. The bottom of the slots are disposed adjacent the end of the insert. The insert also comprises a positioning wafer having an outer diameter slightly smaller than the inner diameter of the sleeve. The wafer has a centrally disposed opening which tightly embraces the explosive cord and is disposed to abut the end of the insert to position the explosive cord within the bore.

BRIEF DESCRIPTION OF THE DRAWINGS

The objects and advantages of this invention will become more apparent from reading the following detailed description in connection with the accompanying drawings, in which:

FIG. 3 is an enlarged plan view of a wafer utilized in this invention;

FIG. 4 is an enlarged sectional view taken along line IV—IV of FIG. 3; and

FIG. 5 is an elevational view of a tubular insert being bent to put a set in the end thereof.

DESCRIPTION OF THE PREFERRED EMBODIMENTS

Figure 1:
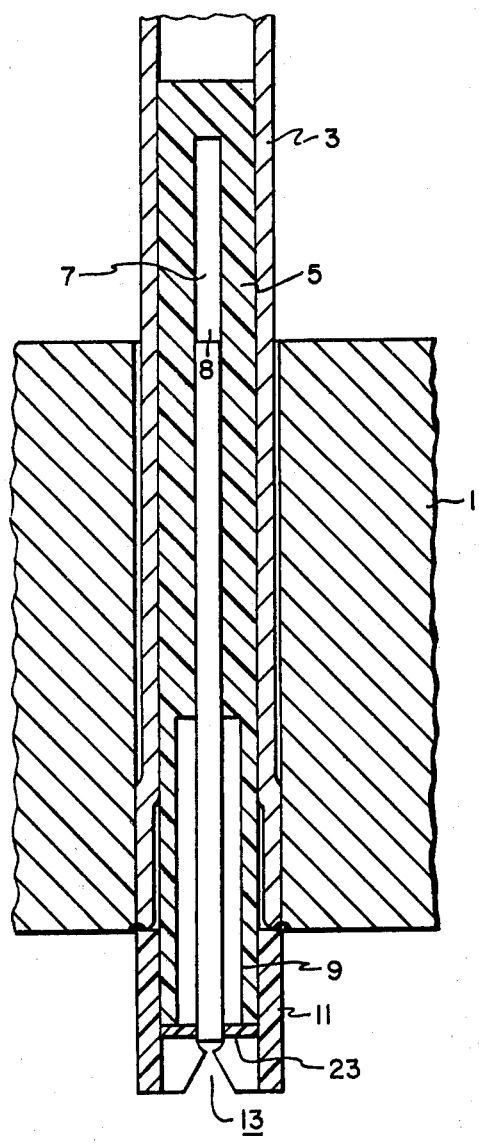
FIG. 1 is a partial sectional view of a heat exchanger having a tube which is to be explosively expanded into engagement with a tube sheet utilizing a resilient tubular insert.

Referring now to the drawings in detail and in particular to FIG. 1, there is shown a portion of a tube sheet 1 of a heat exchanger having a partially expanded tube 3 extending vertically upwardly therefrom. A resilient tubular insert 5 for explosively expanding the tube into engagement with the tube sheet 1 is disposed in the tube 3. The resilient tubular insert 5 is preferably made of polyethylene or other resilient material, which will take a set when bent and has an outer diameter which fits snugly into the tube 3 and a centrally disposed bore 7, which extends partially through the insert so that the one end thereof is closed. The bore 7 is the proper diameter to receive an explosive cord 8 often referred to as a primacord or detonating cord, which when detonated will produce an explosive shock wave, which will expand the insert with sufficient force to expand the tube 3 into engagement with the tube sheet 1 so as to generally form a leak-proof joint therebetween. The insert 5 and bore 7 are substantially longer than the tube sheet 1 is thick to provide an expansion chamber within the insert to trap the products formed by the explosion of the explosive cord 8.

The insert 5 also has a counterbore 9 which forms an attenuation chamber adjacent the outer end of the insert 5 and adjacent the area where the tube 3 is rolled and welded to the tube sheet 1 in order to reduce the explosive forces transmitted to the tube wall in the region of the tube to tube sheet weld and in the area where the tube has already been mechanically expanded into engagement with the tube sheet.

Figure 2:
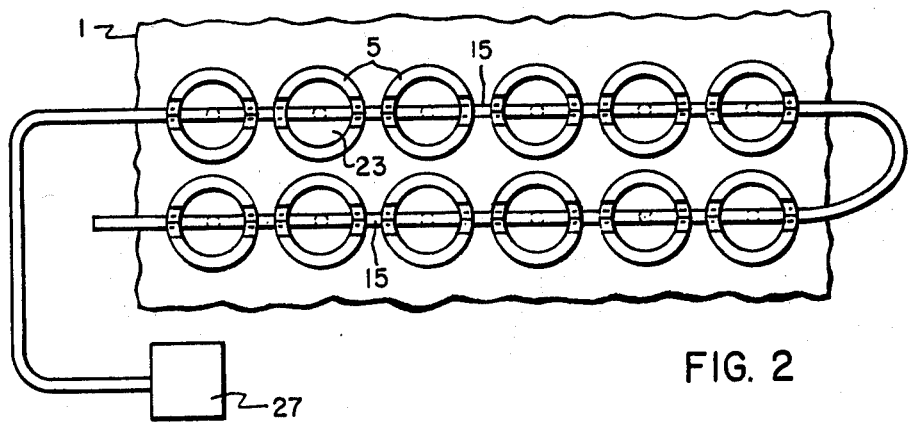
FIG. 2 is a partial sectional view showing an array of inserts disposed within a plurality of tubes.

A resilient sleeve 11 fits over and is fastened or fixed to the open end of the insert 5. The sleeve 11 has a pair of diametrically opposed slots 13 for receiving and snugly holding a detonating cord or trunk line cord 15 as shown in FIG. 2.

The slots 13 are key hole shaped and as best shown in FIG. 5, they have a V-shaped notch or kerf 17 extending to the outer edge of the sleeve 11 and a circular opening 19 slightly smaller in diameter than the trunk line cord 15. The apex of the notch extends into the circular opening leaving a gap 21 where the two meet allowing the trunk line cord 15 to be slipped into the circular opening and captured snugly therein.

A resilient positioning wafer or disc 23, shown in detail in FIGS. 3 and 4, is disposed in the sleeve 11 and abuts the end of the tubular insert 5. The positioning wafer 23 has a generally elliptical-shaped hole 25 centrally disposed therein. The minor diameter of the hole being slightly smaller than the diameter of the explosive cord 8 so that applying pressure on the edge of the disc opposite the major diameter of the elliptical opening distorts the opening allowing the explosive cord 8 to be easily positioned therein and when released to securely clamp the cord in a fixed position. The wafer 23 provides a dual function of positioning the explosive cord 8 axially within the continuation chamber or counterbore 9 and positioning the explosive cord 8 longitudinally within the bore so that the end will be centrally disposed within the sleeve so as to contact the trunk line 15 when it is pressed into the slot 13. The explosive cord 8 must generally be centrally disposed within the counterbore or attenuation chamber 9 and generally extend into the bore only to the inner edge of the tube sheet 1.

When, as shown in FIG. 1, the tube 3 extends vertically upwardly from the tube sheet 1, it is difficult to hold the insert 5 in place within the tube 3 as the outer diameter of the insert 5 is such that it allows the insert 5 to slip freely within the tube 3 and the ends of the tube 3 are rolled so that their inner diameter varies. Therefore, to hold the inserts 5 within the tube 3 the ends of the inserts 5 beyond the portion containing the explosive cord 8 are bent by hand approximately 180° before being inserted into the tube 3. While the resilient insert 5 springs back, it takes a slight set so that the end is curved and when inserted into the tube 3, the insert 5 remains in place. Bending the insert 5 beyond the portion containing the explosive cord 8 allows that portion of the insert 5 containing the explosive cord 8 to remain generally straight so that the portion of the insert containing the explosive cord is centrally disposed within the tube 3 to effectuate even expansion of the tube 3 into engagement with the tube sheet 1.

To further hold the insert 5 in position, the sleeve 11 is biased toward the adjacent sleeve 11 as the trunk line 15 is pushed into the slot 13 and the circular opening 19 snugly captures the trunk line 15 exerting a lateral force on the insert 5 to help hold it within a vertically orient tube 3.

One or more interconnected trunk lines 15 are laced through a plurality of slots 13 in such a manner that the detonation may be performed in a quasi simultaneous matter utilizing a safety fuse or an electric blasting cap as an initiating device 27.

What is claimed is:

1. A method of positioning a resilient insert for explosively expanding a tube into engagement with a tube sheet wherein said insert has a sleeve fixed to one end and said tube extends vertically upwardly from said tube sheet, said method comprising the steps of:

positioning an explosive cord within said insert so that when the insert is in the tube the explosive cord within the insert will have its inner end disposed adjacent the inner edge of the tube sheet, bending the insert starting at a location beyond the inner end of the explosive cord so that when released the insert has a bend set therein, inserting the bent insert into a tube until the sleeve abuts the tube sheet, whereby the bent portion holds the insert in the vertical tube.

2. The method set forth in claim 1 and further comprising the steps of biasing the sleeves of adjacent inserts toward each other and capturing detonating trunk lines within slots in the sleeves to exert a lateral force on the inserts to assist in holding the inserts in place within the vertical tubes.

3. The method set forth in claim 1 and further comprising the steps of:

compressing a wafer having a generally elliptically-shaped centrally disposed opening on diametrically opposite edges and in alignment with the major axis of the elliptical opening in order to distort the opening, positioning the explosive cord within the distorted opening, releasing the edges of the wafer to lock the explosive cord in place.

4. The method set forth in claim 3 wherein the step of positioning the explosive cord comprises positioning the explosive cord so that the distance from one end thereof is essentially equal to the thickness of the tube sheet plus the length of the coextensive portions of the sleeve and the insert.

5. The method set forth in claim 1 wherein the step of bending the end of the insert comprises bending it approximately 180°.

* * * * *